Oct. 19, 1971  C. C. HILL ET AL  3,613,242
SKIN GRAFT CUTTER
Filed Dec. 29, 1966  2 Sheets-Sheet 1
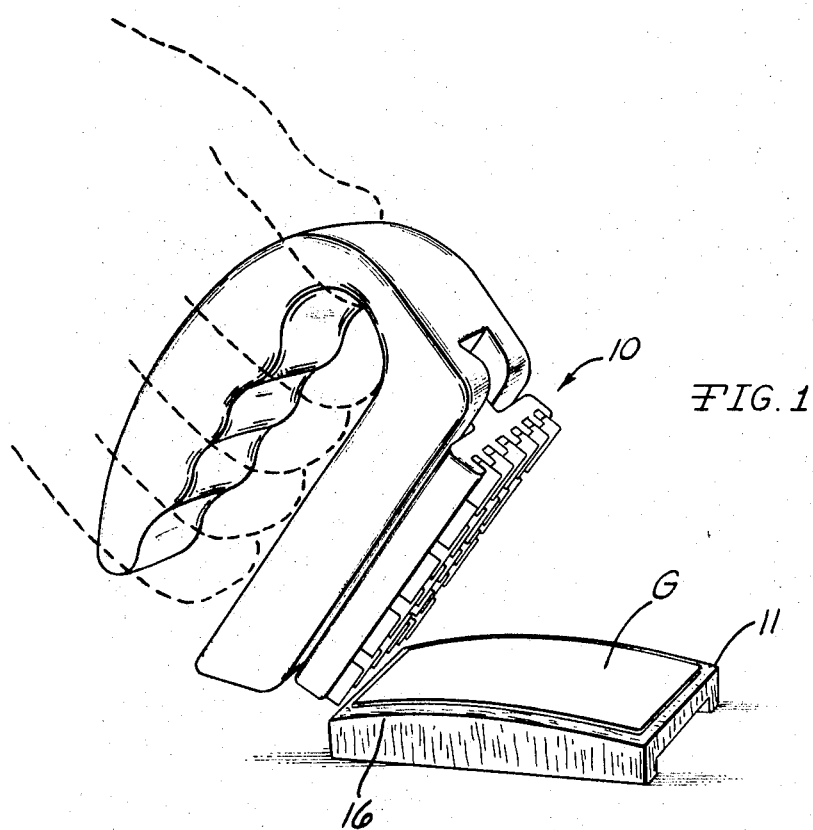
FIG. 1
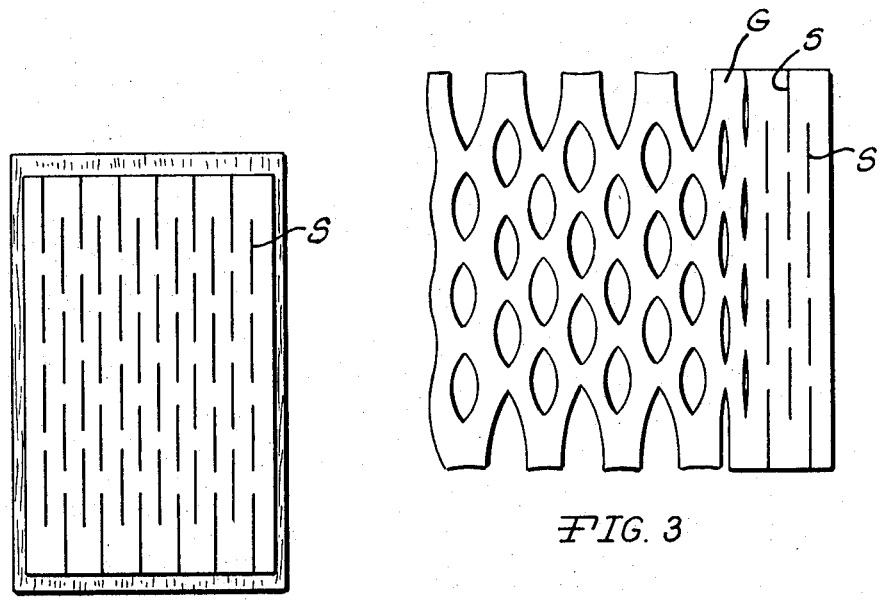
FIG. 2
FIG. 3
INVENTORS
CHARLES C. HILL
FRANK ROMBERGER
ATTORNEYS Oct. 19, 1971  C. C. HILL ET AL  3,613,242
SKIN GRAFT CUTTER
Filed Dec. 29, 1966  2 Sheets-Sheet 2
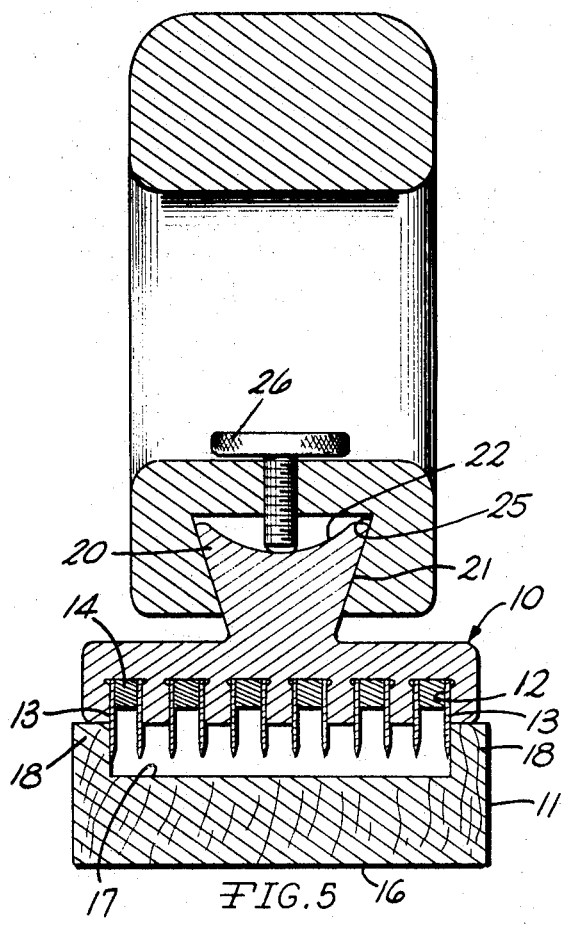
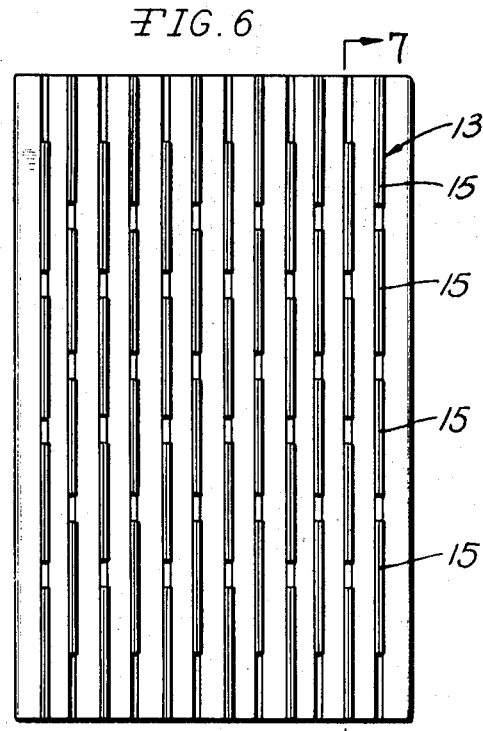
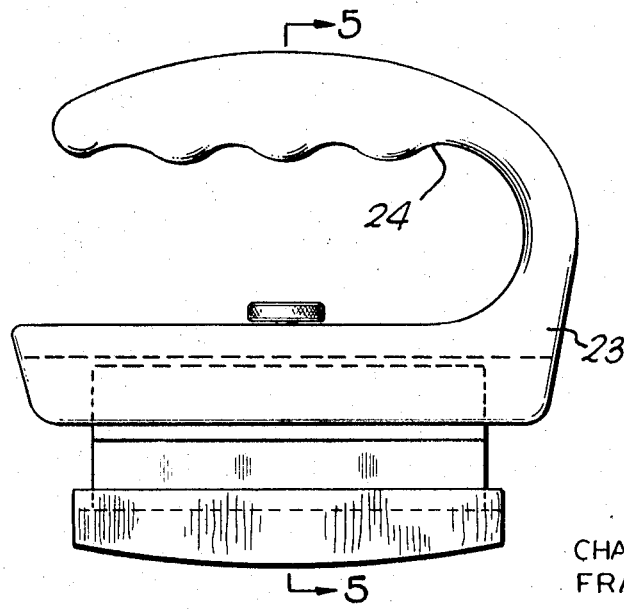
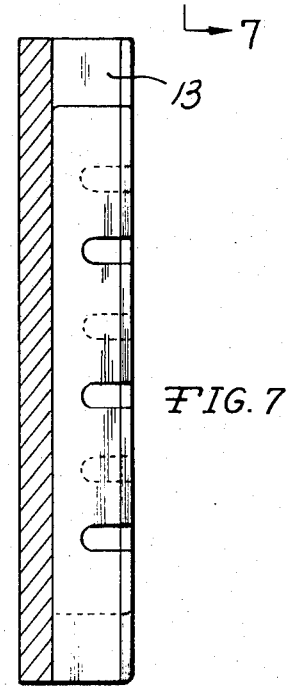
INVENTORS
CHARLES C. HILL
FRANK ROMBERGER
ATTORNEYS

United States Patent Office 3,613,242
Patented Oct. 19, 1971

3,613,242
SKIN GRAFT CUTTER
Charles C. Hill, Ann Arbor, and Frank Romberger, Ferndale, Mich., assignors to Michigan Research Corporation, Ann Arbor, Mich.
Filed Dec. 29, 1966, Ser. No. 605,796
Int. Cl. B26b 3/04
U.S. Cl. 30—305                    1 Claim

ABSTRACT OF THE DISCLOSURE

A skin graft cutter comprising a body which supports a plurality of cutting blades defining longitudinally and transversely spaced cutting edges. A block is provided with a curved surface which supports the skin graft in position for progressive engagement with the cutting edges.

---

This invention relates to skin graft cutters.

In the treatment of severely burned patients, it has been suggested that where the remaining body surface is insufficient to provide the required split thickness skin to cover the burn, the skin grafts be split and expanded in the manner of expanded sheet metal mesh in order that they might cover a greater portion of the body.

Among the objects of the invention are to provide a skin graft cutter which can be utilized concurrently with the graft cutting; which will quickly and efficiently slit the skin; which can be sterilized readily; which is assembled for shipment in a manner to protect the cutting edges and insure that injury will not occur to persons handling the same; which can be disposed or which can be made of readily cleaned and sterilized materials.

The skin graft cutter disclosed herein comprises a body which supports a plurality of cutting blades defining longitudinally and transversely spaced cutting edges. A block is provided with a curved surface which supports the skin graft in position. The body is manipulated so that the cutting edges are progressively brought into engagement with the skin to cut the skin along longitudinally and laterally spaced straight lines. The skin can then be lifted from the block and simultaneously expanded for placement on the patient. In the preferred form the block has a cavity therein oppositely disposed with respect to the curved surface for receiving the cutting blades to permit safe shipment of the cutter. In addition a removable handle may be provided.

In the drawings:

FIG. 1 is a perspective view showing the skin graft cutter in use.

FIG. 2 is a plan view showing the skin graft in position on the cutting block after it is cut.

FIG. 3 is a partly diagrammatic plan view showing the manner in which the skin is progressively lifted from the block and expanded for placement on the patient.

FIG. 4 is a side elevational view of the skin graft cutter in storage or shipping position.

FIG. 5 is a sectional view taken along the line 5—5 in FIG. 4.

FIG. 6 is a bottom plan view of the cutter.

FIG. 7 is a sectional view on a reduced scale taken along the line 7—7 in FIG. 6, Referring to FIG. 1, the skin graft cutter embodying the invention comprises a cutter 10 that is adapted to be progressively brought into engagement with a skin graft G which is placed on a block 11 to form longitudinally and laterally spaced slits S (FIG. 2 therein) so that when the skin is lifted from the block progressively, it is expanded as shown in FIG. 3 for placement on the patient.

As shown in FIGS. 5–7, the cutter 10 comprises a body having a plurality of longitudinally extending parallel grooves 12 in one surface thereof. A pair of blades 13 are positioned in each groove 12 and maintained in spaced relation by a bar 14 of square cross section. The blades and bars are held in firm position by use of a suitable adhesive, preferably an anaerobic adhesive such as Loctite, made by the American Sealant Co.

Each blade 13 comprises a plurality of longitudinally spaced aligned cutting edges 15 of equal length. The length of each groove 12 is greater than the length of each blade 13 and alternate blades have their free ends aligned with the end of body 10 so that the cutting edges 15 of adjacent blades are longitudinally and transversely spaced relative to one another. Specifically, the length of each groove 12 is greater than the length of each blade 13 by an amount which is equal to substantially one-half the distance between comparable points on the successive cutting edges of the blade.

The block 11 has an upwardly curved surface 16 which is preferably a portion of a cylinder. The block 11 also includes a recessed surface 17 defining side walls 18 on a face opposite from the surface 15. The distance between the side walls 18 is such that they will frictionally engage the outermost blades 13 to provide an assembly protecting the blades during shipment. The assembly as shown in FIG. 4 can be utilized to prevent damage to the blades or persons handling the cutter during shipment.

The body 10 is also provided with a longitudinally extending projection 20 that has side walls 21 tapering inwardly and a concave surface 22. The projection 20 may be used as a handle or a removable handle 23 may be used. Removable handle 23 which has a finger receiving opening 24 is preferably provided and includes a dovetail groove 25 telescoped over the projection 20. A lock screw 26 is threaded downwardly for engagement with the surface 22.

In use as shown in FIG. 1, the skin is placed on the curved surface 16 and the cutter is grasped by projection 20, or by handle 23 if it is used, and given a rolling action along the block to bring successive cutting edges 15 into engagement with the skin. The operator firmly presses the cutting edges against the curved surface so that the skin is pierced to define the slits C. The skin may then be lifted from the block and as it is lifted to expand it as shown in FIG. 3 for placement on the patient. Instead of utilizing the handle 23, the projection 20 may be grasped directly in order to manipulate the cutter 10. Although the size of the skin graft which is applied to the block is shown as being smaller than the block, it should be understood that any size skin graft may be placed on the block. If the skin graft is larger than the block, then successive portions thereof can be placed on the block for cutting.

It has been found that good results are achieved when the block is made of wood with the end grain of the wood contacting the cutting edges. When the grain runs in this manner, the cutting blades tend to penetrate the block further and thereby insure complete cutting of the skin.

The entire assembly of cutter 10 and block 11 not only serves as a means for safely handling the cutter but can be simultaneously sterilized as an assembly prior to usage. After usage, the cutter and block can be thrown away. Alternatively if the cutter blades are made of suitable material such as stainless steel, the cutter and block may be cleaned, sterilized and reused.

We claim:
1. A skin graft cutter comprising
   a body having a substantially planar surface with a plurality of longitudinally spaced grooves of substantially uniform width therein,
   a pair of blades positioned in each said groove,
   spacer means between each pair of blades holding the blades in spaced apart relation along the side walls of the grooves,
   each said blade providing a plurality of longitudinally spaced aligned cutting edges,
   said body including an integral projection extending outwardly from the surface opposite the surface containing the grooves and providing a handle whereby the body can be grasped, and
   a handle assembly for engaging said projection,
   said handle assembly comprising
      a body having finger receiving portions and a groove substantially complementary in shape to the projection and telescoped thereover, and fastening means comprising a screw threaded in said body and adapted to engage said projection.

References Cited

UNITED STATES PATENTS

| | | | |
|---|---|---|---|
| 693,627 | 2/1902 | Sharp | 146—215 |
| 717,223 | 12/1902 | Leachman | 30—304 X |
| 843,427 | 2/1907 | Atkinson et al. | 30—304 X |
| 1,558,369 | 10/1925 | Jones | 30—304 X |
| 1,692,574 | 11/1928 | Roessler | 30—304 |
| 2,186,429 | 1/1940 | Reinwald | 30—304 |
| 2,718,198 | 9/1955 | Bayley | 107—1 |
| 2,791,029 | 5/1957 | Hennesberger | 30—305 |
| 2,323,667 | 7/1943 | Moldawsky | 17—30 |
| 2,594,174 | 4/1952 | Johnson | 30—172 X |
| 3,114,973 | 12/1963 | Kennedy | 30—342 |

FOREIGN PATENTS

| | | | |
|---|---|---|---|
| 244,555 | 3/1947 | Switzerland | 30—305 |

ROBERT C. RIORDON, Primary Examiner

J. C. PETERS, Assistant Examiner

U.S. Cl. X.R.

128—305.5